United States Patent
Tanuma (10) Patent No.: US 8,026,473 B2
(45) Date of Patent: Sep. 27, 2011

(54) TILT SENSOR

(75) Inventor: Yuki Tanuma, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 12/569,359

(22) Filed: Sep. 29, 2009

(65) Prior Publication Data

US 2010/0078549 A1 Apr. 1, 2010

(30) Foreign Application Priority Data

Oct. 1, 2008 (JP) ................................. 2008-256059

(51) Int. Cl.
*G01D 5/34* (2006.01)
*G01C 9/10* (2006.01)

(52) U.S. Cl. ............... 250/231.1; 250/222.1; 356/139.1; 200/61.52

(58) Field of Classification Search ............... 250/231.1, 250/239, 221, 222.1; 356/139.1; 200/61.45 R, 200/61.52
See application file for complete search history.

(56) References Cited

U.S. PATENT DOCUMENTS

| | | | | |
|---|---|---|---|---|
| 6,140,635 A * | 10/2000 | Kazumi et al. | ............. | 250/231.1 |
| 6,392,223 B1 * | 5/2002 | Hjertman et al. | .......... | 250/231.1 |
| 6,664,534 B2 * | 12/2003 | Hjertman et al. | .......... | 250/231.1 |
| 6,690,457 B2 * | 2/2004 | Yamaguchi | ................ | 356/139.1 |
| 6,943,339 B2 * | 9/2005 | Figueria et al. | ............ | 250/222.1 |
| 7,319,514 B2 * | 1/2008 | Ritchie et al. | ................. | 356/138 |
| 2002/0071114 A1 * | 6/2002 | Yamaguchi | ................ | 356/139.1 |
| 2002/0100868 A1 * | 8/2002 | Hjertman et al. | .......... | 250/231.1 |
| 2002/0141673 A1 * | 10/2002 | Ito et al. | ........................ | 384/448 |
| 2004/0126043 A1 * | 7/2004 | Ito | ................................. | 384/448 |
| 2004/0187602 A1 * | 9/2004 | Okada | ...................... | 73/862.042 |
| 2005/0092096 A1 * | 5/2005 | Okada | ............................ | 73/760 |
| 2009/0051905 A1 * | 2/2009 | Childers et al. | ............. | 356/139.1 |
| 2009/0266168 A1 * | 10/2009 | Shimase | ........................ | 73/649 |
| 2010/0078549 A1 * | 4/2010 | Tanuma | ..................... | 250/231.1 |
| 2010/0101103 A1 * | 4/2010 | Horio et al. | ................ | 33/366.23 |
| 2010/0188654 A1 * | 7/2010 | Horio | ......................... | 356/139.1 |
| 2010/0220319 A1 * | 9/2010 | Lai | ............................. | 356/139.1 |

FOREIGN PATENT DOCUMENTS

| | | |
|---|---|---|
| EP | 1 956 341 | 8/2008 |
| JP | 2007-139643 | 6/2007 |

* cited by examiner

*Primary Examiner* — John Lee (74) *Attorney, Agent, or Firm* — Hamre, Schumann, Mueller & Larson, P.C.

(57) ABSTRACT

A tilt sensor includes a mount board, a cover, a light emitting and two light receiving elements on the mount board. A case, provided between the mount board and the cover, is formed with an inner space surrounded by the light emitting element and the light receiving elements. A rolling member, movable in the inner space, can take a complete shielding position, a partial shielding position and an unshielding position. At the complete shielding position, the rolling member blocks the light from the light emitting element so that no light reaches the two light receiving elements. At the partial shielding position, the rolling member blocks the light so that the light reaches only one of the two light receiving elements. At the unshielding position, the rolling member does not block the light at all so that the light reaches the two light receiving elements.

10 Claims, 10 Drawing Sheets

TILT SENSOR

BACKGROUND OF THE INVENTION

1. Field of the Invention

The present invention relates to a tilt sensor for detecting the tilting of a device such as a digital still camera or a mobile phone, for example.

2. Background of the Art

Figure 12:
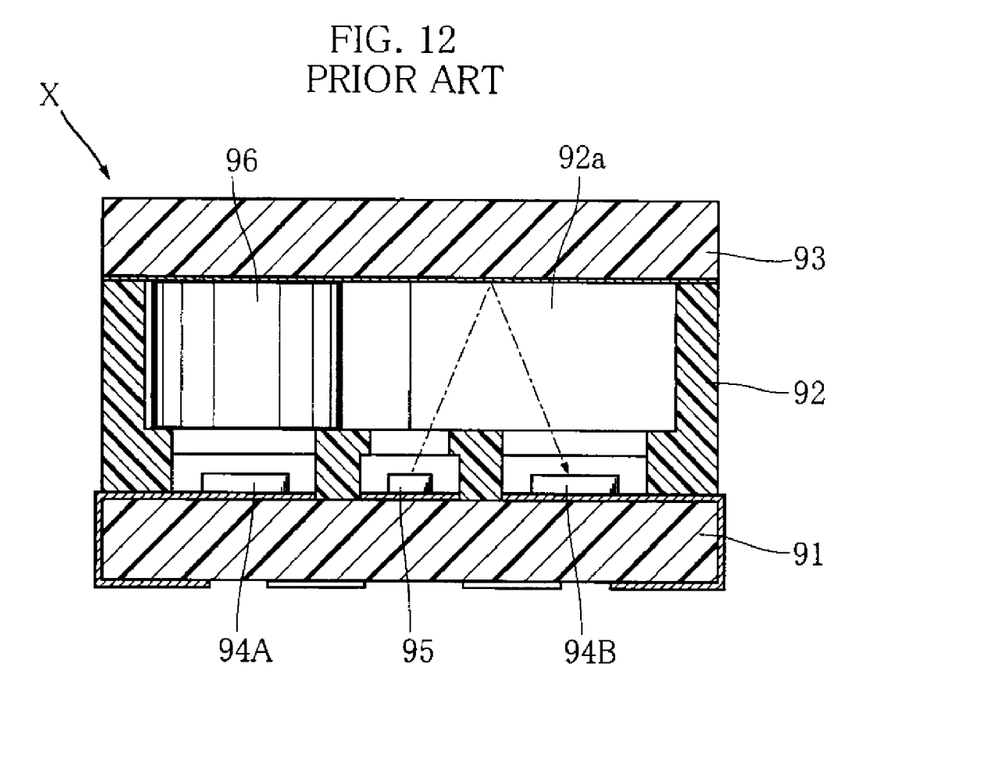
FIG. 12 is a sectional view illustrating a conventional tilt sensor.
Figure 13:
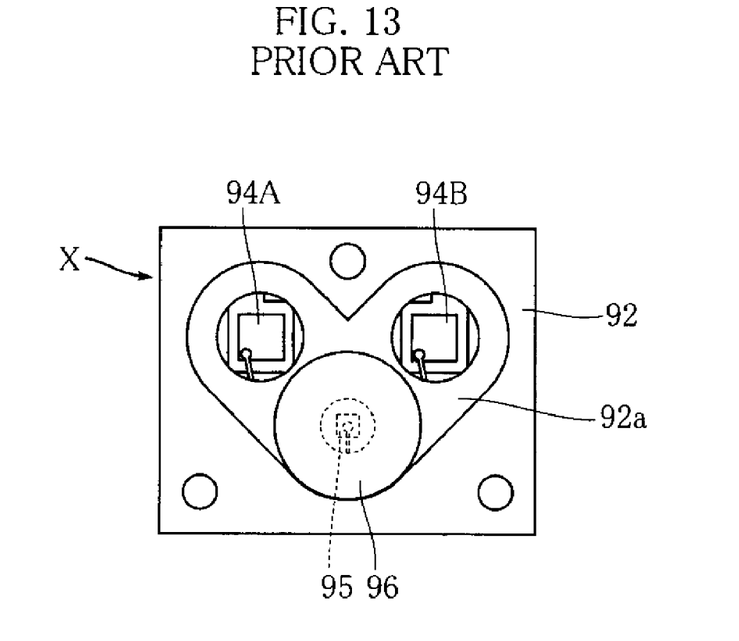
FIG. 13 is a front view illustrating the conventional tilt sensor.

FIGS. 12 and 13 illustrate an example of conventional tilt sensor (see JP-A-2007-139643). The illustrated tilt sensor X includes a substrate 91, a case 92, a cover 93, a pair of light receiving elements 94A and 94B, a light emitting element 95 and a cylindrical rolling member 96. The light receiving elements 94A, 94B and the light emitting element 95 are mounted on the obverse surface of the substrate 91 and enclosed by the case 92. The case 92 and the cover 93 define a space 92a, into which the light emitting element 95 emits light. Then, the light may be reflected several times by the inner wall surface of the case 92 until it reaches the light receiving elements 94A and 94B. The rolling member 96 is arranged to roll within the space 92a. The substrate 91 is formed, at its reverse surface, with terminals to be used for the surface mounting of the tilt sensor to e.g. a circuit board.

FIG. 13 illustrates the state in which the tilt sensor X is held in an upright position, and the rolling member 96 is settled at the lowermost position due to gravity. In this position, the rolling member 96 conceals the light emitting element 95, blocking the light emitted from the light emitting element 95. Thus, no light from the element 95 reaches the left and right light receiving elements 94A, 94B.

When the tilt sensor X is tilted to the left (i.e., turned counterclockwise in FIG. 13), the rolling member 96 will move in the space 92a and go to a position at which the rolling member 96 conceals the left light receiving member 94A. In this state, the light emitted from the light emitting element 95 is received by the right light receiving element 94B, but not by the left light receiving element 94B. Likewise, when the tilt sensor X is tilted to the right from the upright position (shown in FIG. 13), the rolling member 96 will conceal the right light receiving member 94B, and the light from the light emitting element 95 is received only by the left light receiving element 94A.

The tilt sensor X may be incorporated in a mobile phone provided with a display unit, through which the user can view visual information. With such a mobile phone, it is possible to make arrangements for adjusting the orientation of the displayed images, based on the tilt detection by the tilt sensor X. Thus, the use can view the corrected images in the proper position even when the mobile phone is tilted by the user.

The conventional tilt sensor X may still remain to be improved in the following respect. As seen from FIG. 12, the space 92a accommodating the rolling member 96 is stacked on the space accommodating the light receiving elements 94A, 94B and the light emitting element 95. Accordingly, the overall thickness of the tilt sensor X is inevitably much greater than a total of the height of the light receiving elements 94A, 94B (or the light emitting element 95) and the length of the rolling member 96. This is a hindrance to provide a compact tilt sensor.

SUMMARY OF THE INVENTION

The present invention has been proposed under the circumstances described above. It is therefore an object of the present invention to provide a tilt sensor which is more compact than the conventional tilt sensor.

According to the present invention, there is provided a tilt sensor including: a mount board; a cover plate spaced from the mount board; a light emitting element and a pair of light receiving elements arranged on an obverse surface of the mount board; a case arranged between the mount board and the cover plate for accommodating the light emitting element and the light receiving elements, the case being formed with an inner space surrounded by the light emitting element and the light receiving elements; and a rolling member movably accommodated in the inner space to take any one of a complete light shielding position, a partial light shielding position and a light unshielding position. The complete light shielding position is a position at which the rolling member blocks light emitted from the light emitting element so that the light does not reach neither of the paired light receiving elements. The partial light shielding position is a position at which the rolling member blocks the light emitted from the light emitting element so that the light reaches only one of the paired light receiving elements. The light unshielding position is a position at which the rolling member does not block the light emitted from the light emitting element so that the light reaches both of the paired light receiving elements.

Preferably, the tilt sensor of the present invention may further include a reflective film that is formed on the cover plate and exposed to the inner space.

Preferably, the tilt sensor of the present invention may further include a ground terminal formed on the mount board. In this instance, the reflective film and the case may be made of an electrically conductive material, so that the ground terminal is electrically connected to the reflective film via the case.

Preferably, the case may include a facing surface that faces the cover plate, and the reflective film is formed with a slit that overlaps the facing surface.

Preferably, the tilt sensor of the present invention may further include an accommodation space to accommodate one of the light receiving elements and the light emitting element. In this case, the above-mentioned slit extends beyond the facing surface to the accommodation space.

Preferably, the case may include a facing surface that faces the cover plate and is formed with a groove.

Preferably, the tilt sensor of the present invention may further include an accommodation space connected to the inner space and accommodating one of the paired light receiving elements. In this instance, a light shielding member may be provided along the boundary between the inner space and the accommodation space in a manner such that the light shielding member is spaced from the obverse surface of the mount board.

Preferably, the tilt sensor of the present invention may further include an accommodation space connected to the inner space and accommodating the light emitting element. In this instance, a light shielding member may be provided along the boundary between the inner space and the accommodation space in a manner such that the light shielding member is spaced from the obverse surface of the mount board.

Preferably, the light emitting element and the light receiving elements are located entirely outside the inner rolling space when viewed in a direction perpendicular to the obverse surface of the mount board.

Preferably, the rolling member overlaps the light emitting element and the light receiving elements when viewed in a direction parallel to the obverse surface of the mount board.

Preferably, the light emitting element and the light receiving elements are arranged adjacent to three sides of the rectangular case, respectively.

Other features and advantages of the present invention will become more apparent from detailed description given below with reference to the accompanying drawings.

DETAILED DESCRIPTION OF THE PREFERRED EMBODIMENTS

Preferred embodiments of the present invention are described below with reference to the accompanying drawings.

FIGS. 1-9 illustrate a tilt sensor A1 according to a first embodiment of the present invention.

Figure 1:
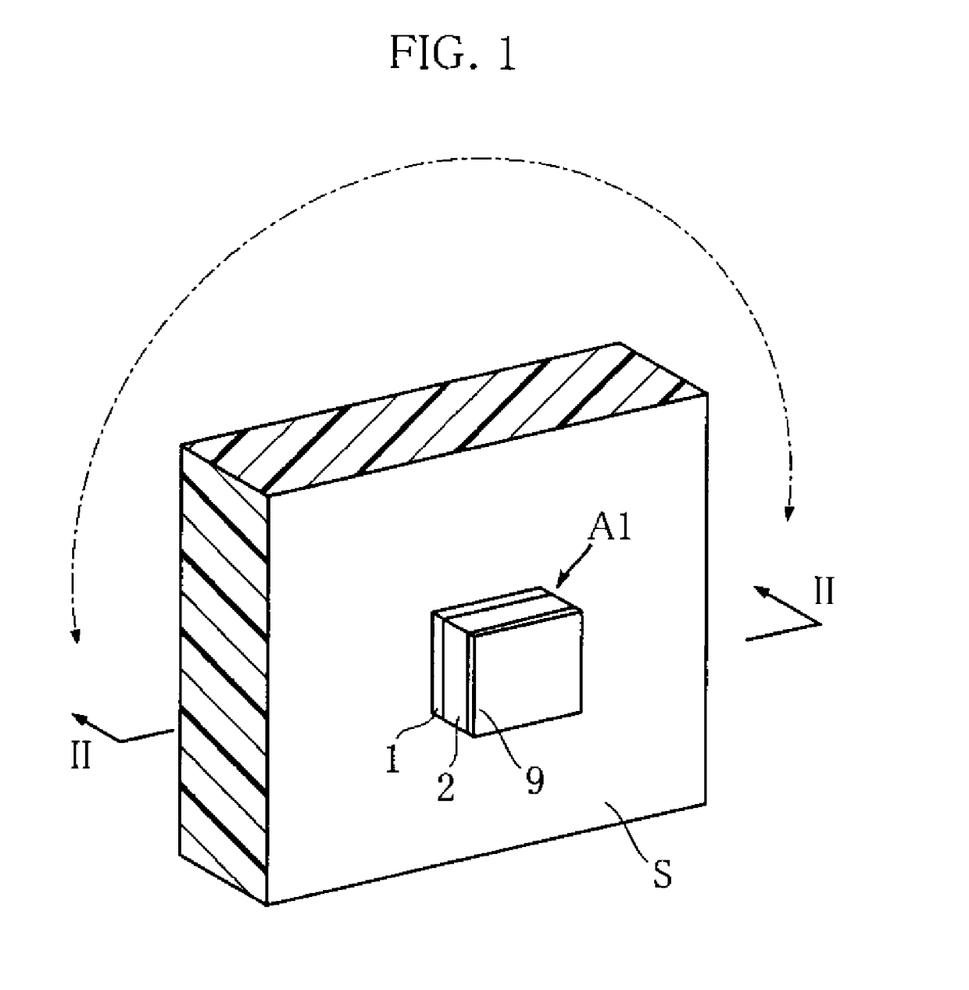
FIG. 1 is a perspective view illustrating a tilt sensor according to a first embodiment of the present invention.
Figure 2:
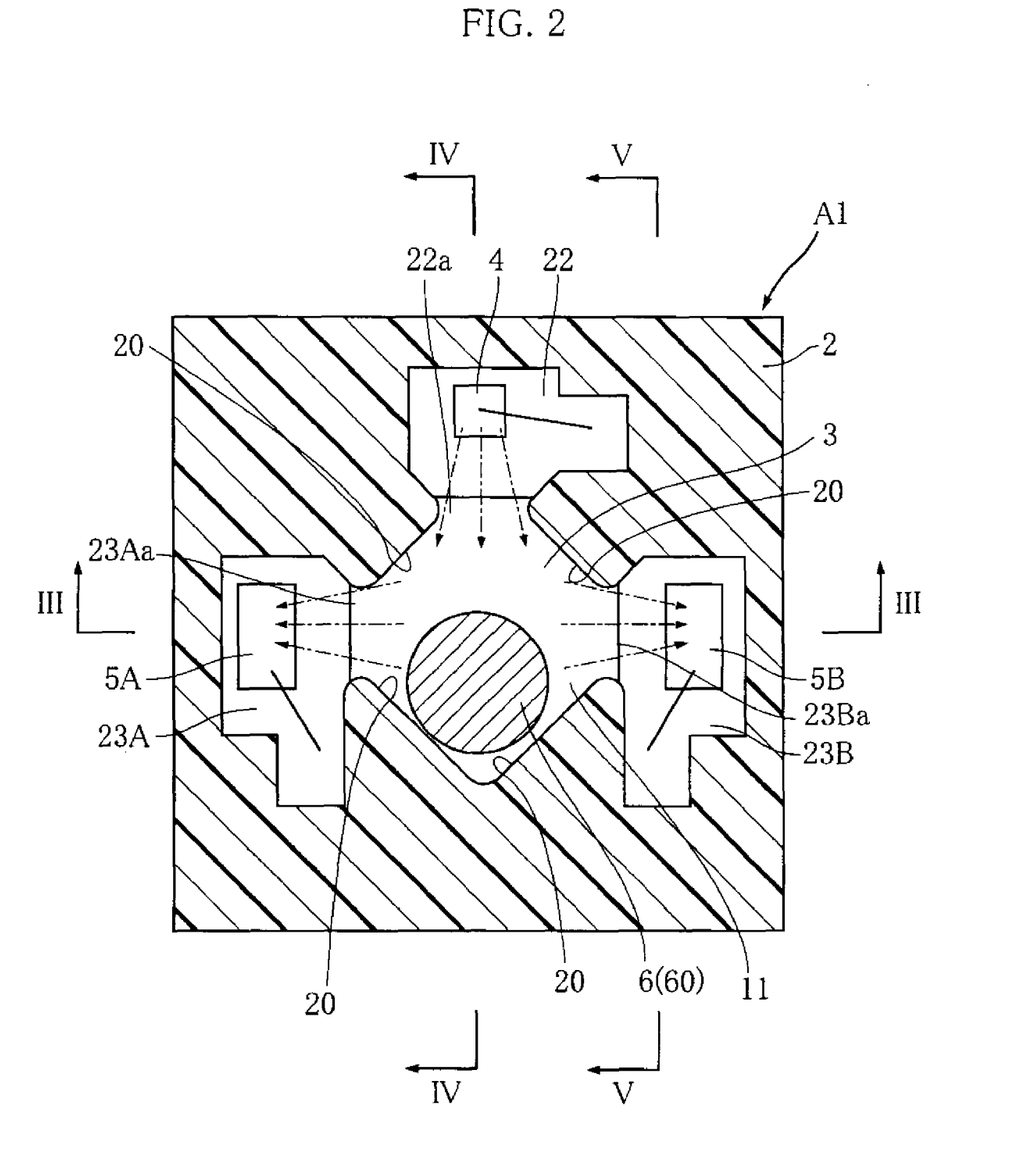
FIG. 2 is a sectional view taken along lines II-II in FIG. 1.
Figure 3:
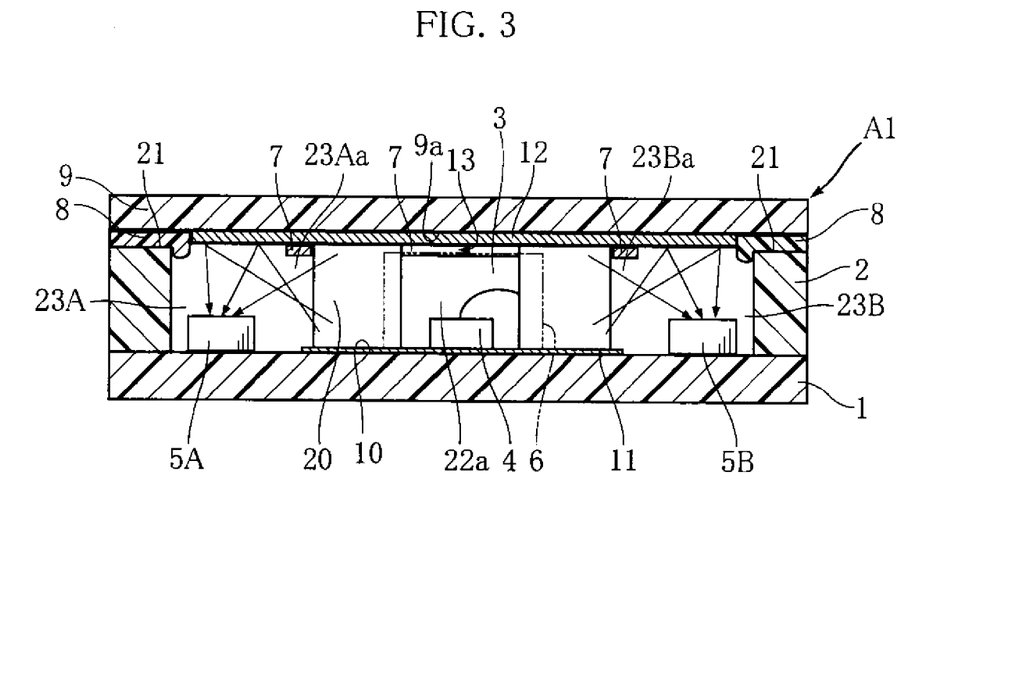
FIG. 3 is a sectional view taken along lines III-III in FIG. 2.
Figure 4:
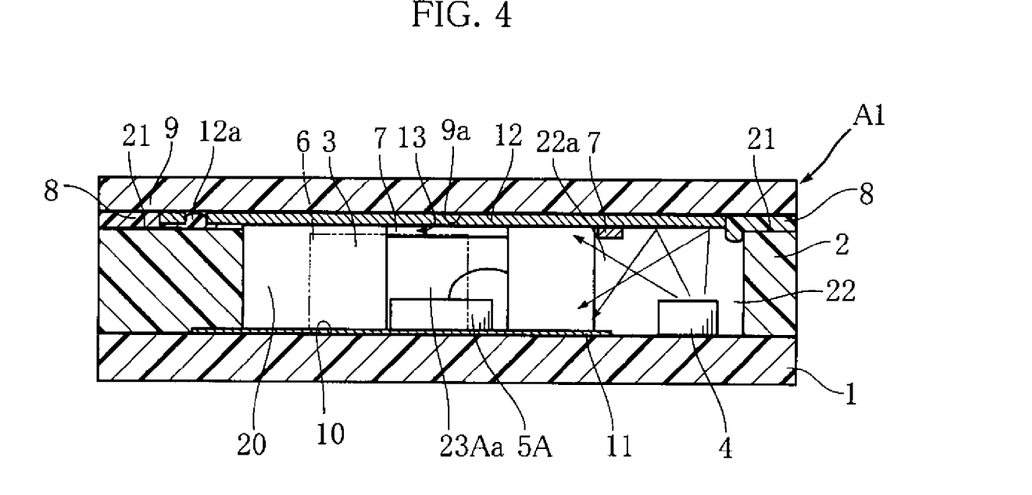
FIG. 4 is a sectional view taken along lines IV-IV in FIG. 2.
Figure 5:
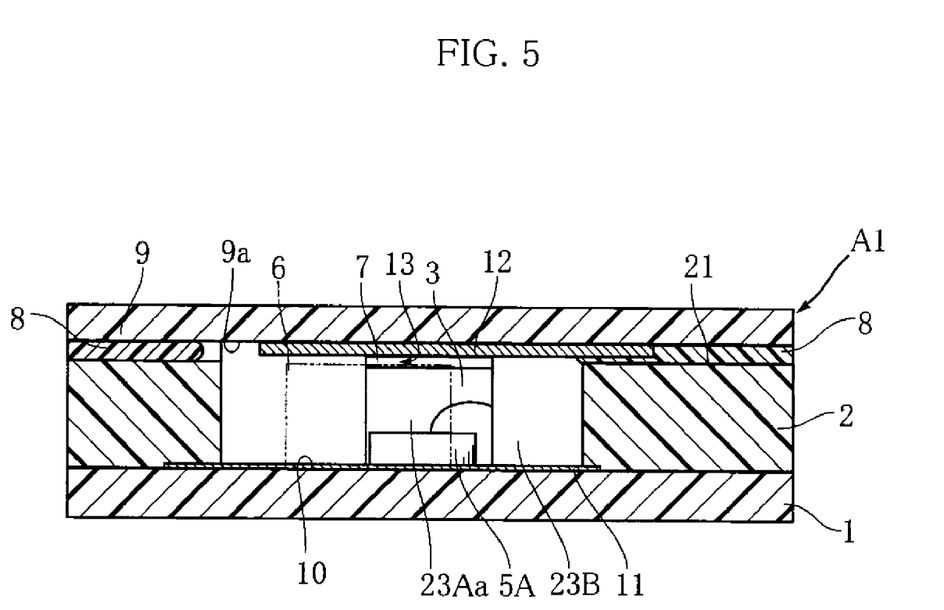
FIG. 5 is a sectional view taken along lines V-V in FIG. 2.
Figure 6:
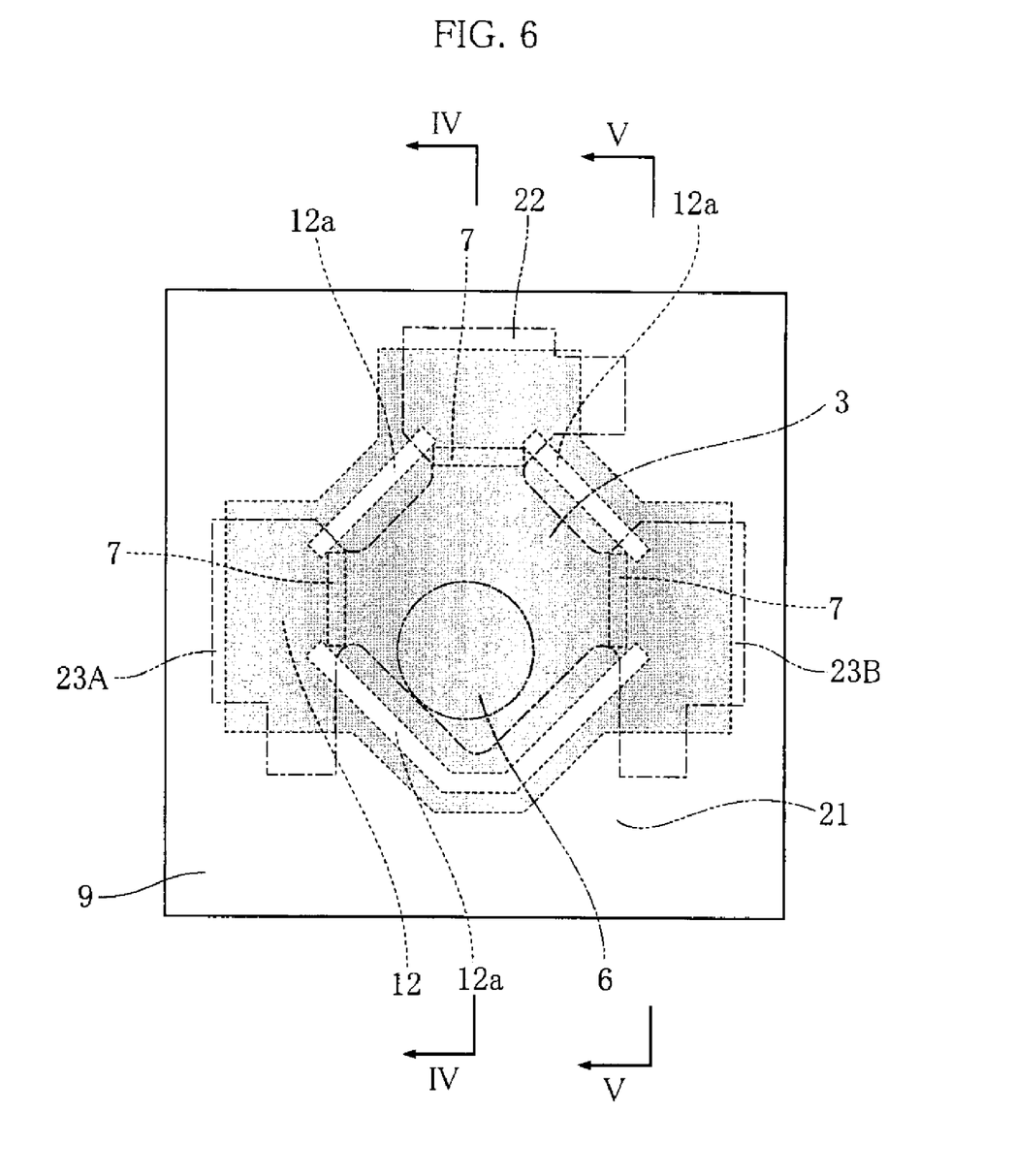
FIG. 6 is a plan view showing a cover plate and a reflective film.

As illustrated in FIG. 1, the tilt sensor A1 can be surface-mounted on an upright or substantially upright circuit board S to detect the tilting of the circuit board X within a tilt detection target plane, that is, the plane containing the obverse surface of the circuit board S. In this embodiment, the tilt sensor A1 has a size of about 3.3 mm×3.3 mm and a thickness of about 0.8 mm. As shown in FIGS. 2-4, the tilt sensor A1 includes a mount board 1, a case 2, a light emitting element 4, a pair of light receiving elements 5A and 5B, a rolling member 6, a cover plate 9 and a reflective film 12. In FIGS. 3-5, the rolling member 6 is illustrated by imaginary lines. FIG. 6 illustrates the cover plate 9 and the reflective film 12 as viewed in the direction normal to the cover plate 9. For easier understanding, the reflective film 12 is shaded, while the case 2 and the rolling member 6 are illustrated by imaginary lines.

As illustrated in FIGS. 3 and 4, the mount board 1 is a rectangular insulating substrate and made of e.g. a glass fiber-reinforced epoxy resin. In this embodiment, the mount board 1 has a size of about 3.3 mm×3.3 mm and a thickness of about 0.2 mm. The mount board 1 is formed with a wiring pattern made of e.g. a Cu—Ni—Au plating layer. The wiring pattern includes portions formed on the obverse and the reverse surface of the mount board 1 and through-hole portions electrically connecting the obverse and the reverse portions. The light emitting element 4 and the light receiving elements 5A and 5B are bonded to the portion of the wiring pattern on the obverse surface of the mount board 1. The portions of the wiring pattern on the reverse surface of the mount board 1 serve as terminals for surface mounting the tilt sensor A1 to a circuit board S. As illustrated in FIGS. 3 and 4, the obverse surface 10 of the mount board 1 is formed with a plating layer 11. The plating layer 11 is connected to a portion of the wiring pattern on the mount board 1 which is electrically connected to the ground line of the circuit board S.

The light emitting element 4 is e.g. a light emitting diode which emits infrared light and arranged adjacent to one side of the mount board 1. In this embodiment, the light emitting element 4 has a size of about 0.25 mm×0.25 mm.

The light receiving elements 5A and 5B may be phototransistors. Upon receiving infrared light, the light receiving elements 5A and 5B generate a photoelectromotive force corresponding to the amount of light received and cause current to flow. As illustrated in FIG. 2, the light receiving elements 5A and 5B are arranged adjacent to two facing sides of the mount board 1 to be spaced from each other. In this embodiment, the light receiving elements 5A and 5B have a size of about 0.6 mm×0.4 mm.

The case 2 may be in the form of a rectangular parallelepiped and made of e.g. an epoxy resin. Alternatively, the case 2 may be made of an electrically conductive material. The case 2 has a size of about 3.3 mm×3.3 mm and a thickness of about 0.6 mm. As illustrated in FIG. 4, the case 2 is partially in contact with the plating layer 11.

The cover plate 9 is rectangular and made of an insulating material such as an epoxy resin.

The mount board 1 is bonded to one side (lower side in FIGS. 3 and 4) of the case 2, whereas the cover plate 9 is bonded to the other side (upper side in FIGS. 3 and 4) of the case 2 via an adhesive 8. The case 2 is formed with a main space 3 and accommodation spaces 22, 23A, 23B, and these spaces are closed by the mount board 1 and the cover plate 9. Thus, the space 3 can be said to be defined by the inner side surfaces 20 of the case 2, the inner surface 10 of the mount board 1 and the inner surface 9a of the cover plate 9. The case 2 has a facing surface 21 that faces the inner surface 9a of the cover plate 9. The facing surface 21 is connected to the inner side surfaces 20 of the case 2.

As illustrated in FIGS. 2 and 4, the light emitting element 4 is arranged in the accommodation space 22. The boundary between the accommodation space 22 and the space 3 serves as a light emitting port 22a. The light emitted from the light emitting element 4 enters the space 3 through the light emitting port 22a.

As illustrated in FIGS. 2 and 3, the light receiving elements 5A and 5B are arranged in the accommodation spaces 23A and 23B, respectively. The boundary between the accommodation space 23A and the space 3 serves as a light incident port 23Aa. Similarly, the boundary between the accommodation space 23B and the space 3 serves as a light incident port 23Ba. The light travels from the space 3 into the accommodation spaces 23A and 23B through the light incident ports 23Aa and 23Ba to reach the light receiving elements 5A and 5B.

The rolling member 6 is arranged in the space 3 in a manner such that it can move to predetermined positions in the space 3 in accordance with the posture of the tilt sensor A1. As shown in FIG. 2, the space 3 is generally rectangular and has a size of about 1.3 mm×1.3 mm. The light emitting port 22a and the light incident ports 23Aa and 23Ba are positioned at three of the four vertices of the rectangle of the space 3.

As illustrated in FIGS. 3-6, the reflective film 12 is formed on the inner surface 9a of the cover plate 9. Part of the reflective film 12 is exposed to the space 3. The reflective film 12 has a laminated structure made up of e.g. a Cu layer, an Ni layer and an Au layer. The light emitted from the light emitting element 4 may be reflected by the reflective film 12 and directed toward the light receiving elements 5A, 5B. As illustrated in FIGS. 4-6, the reflective film 12 is formed with slits 12*a* at positions facing the facing surface 21 of the case 2. As illustrated in FIG. 6, or as viewed in plan, each of the slits 12*a* extends beyond the facing surface 21 to overlap the accommodation space 22, 23A or 23B. As shown in FIGS. 3 and 4, the slits 12*a* are filled with the adhesive 8.

As illustrated in FIGS. 3-6, light shields 7 are provided on the inner surface of the reflective film 12. The light shields 7 correspond in position to the light emitting port 22*a* and the light incident ports 23Aa and 23Ba (see FIG. 6), in other words, correspond in position to the boundary between the main space 3 and one of the accommodation spaces 22, 23A, 23B. Each light shield 7 projects downward by a predetermined distance, to be spaced from the inner surface of the mount board 1. As seen from FIG. 5, for example, there is a gap 13 between the rolling member 6 and the cover plate 9 when the rolling member 6 is held in contact with the mount board 1. As viewed in an in-plane direction (which is parallel to the inner surface of the mount board 1 or the cover plate 9), each of the light shields 7 can overlap and close the gap 13. To this end, the projection length of each light shield 7 is set to be great enough to cause the light shield 7 to overlap at least a portion of the rolling member 6. The light shields 7 may be made of Cu. Alternatively, the light shields 7 may be made of a resin.

The workings of the tilt sensor A1 will be described below.

FIG. 2 illustrates the tilt sensor A1 in the initial upright (or substantially upright) posture. It should be noted that the gravitational pull works downward in FIG. 2 and FIGS. 7-9. In the initial state shown in FIG. 2, the rolling member 6 in the space 3 is held at a position opposite to the light emitting port 22*a*. This position is referred to as the light unshielding position 60. In this state, the light emitted from the light emitting element 4 enters the space 3 through the light emitting port 22*a*. Then, the light may be reflected repetitively in the space 3, and reaches both of the light receiving elements 5A and 5B through the light incident ports 23Aa and 23Ba. Upon detecting the light, the light receiving elements 5A and 5B output corresponding signals ("light reception signals"). Thus, when light reception signals are outputted from both of the light receiving elements 5A and 5B, it is determined that the rolling member 6 is at the light unshielding position 60, i.e., the tilt sensor A1 is in the initial upright position shown in FIG. 2.

Figure 7:
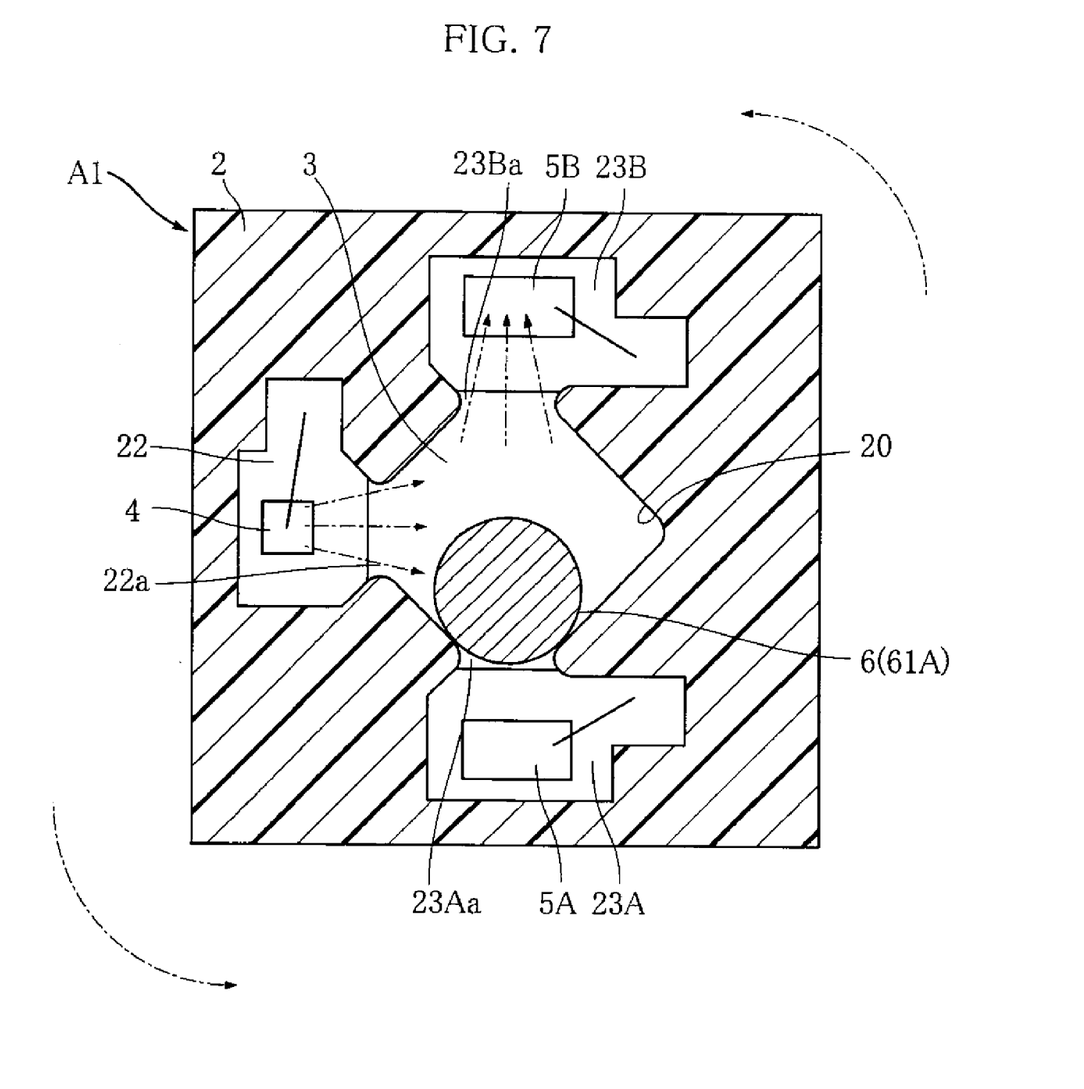
FIG. 7 is a sectional view illustrating the tilt sensor in the state in which the rolling member is at a partial light shielding position.

When the tilt sensor A1 is turned counterclockwise through 90 degrees from the initial state shown in FIG. 2, the tilt sensor A1 takes the posture shown in FIG. 7. In this state, the rolling member 6 is held at a position facing the light incident port 23Aa. Hereinafter, this position is referred to as a partial light shielding position 61A. In this state, the light incident port 23Aa is closed by the rolling member 6. Thus, the light emitted from the light emitting element 4 reaches only the light receiving element 5B through the light incident port 23Ba and does not reach the light receiving element 5A. Thus, when a light reception signal is outputted only from the light receiving element 5B, it is determined that the rolling member 6 is at the partial light shielding position 61A, i.e., the tilt sensor A1 has settled into the posture shown in FIG. 7.

Figure 8:
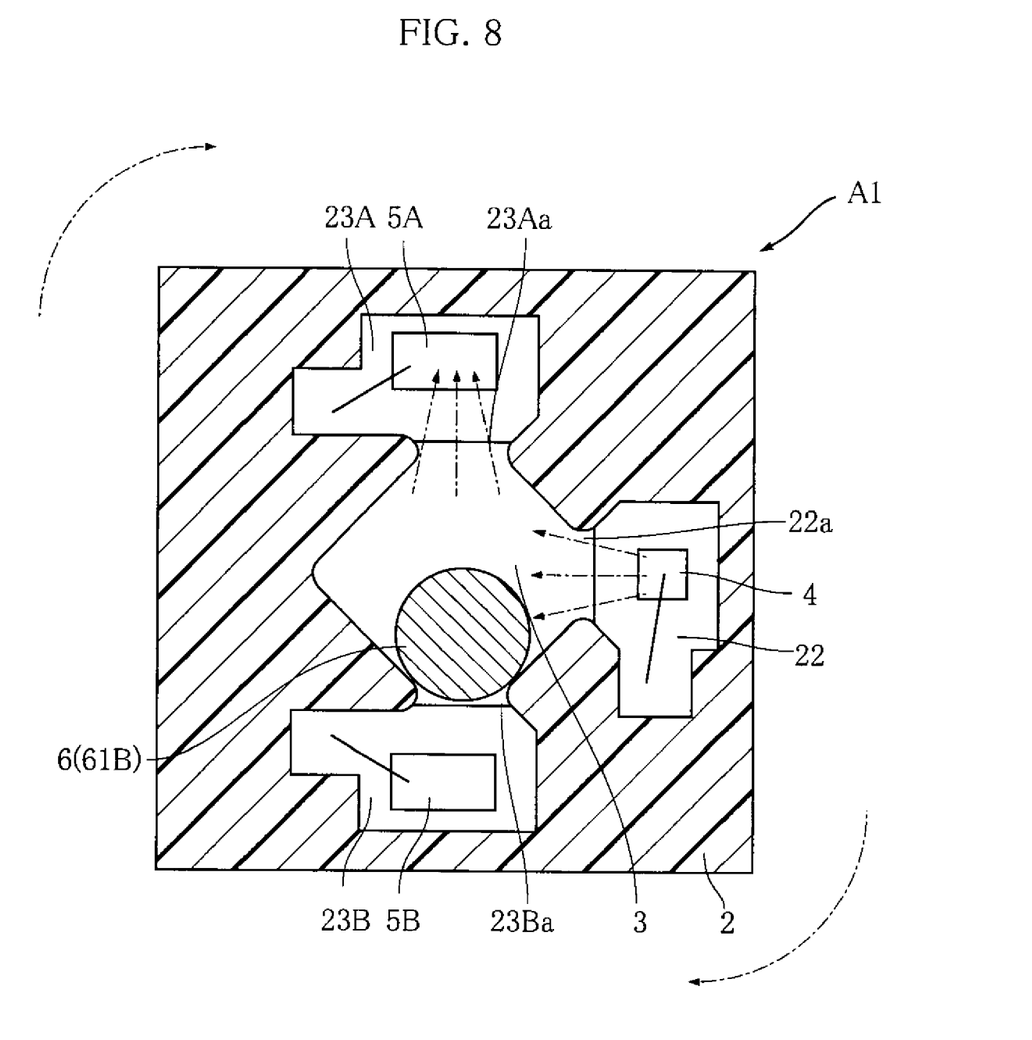
FIG. 8 is a sectional view illustrating the tilt sensor in the state in which the rolling member is at another partial light shielding position.

When the tilt sensor A1 is turned clockwise through 90 degrees from the state shown in FIG. 2, the tilt sensor A1 takes the posture shown in FIG. 8. In this state, the rolling member 6 is at a position facing the light incident port 23Ba. This position is also referred to as a partial light shielding position 61B. In this state, the light incident port 23Ba is closed by the rolling member 6. Thus, the light emitted from the light emitting element 4 reaches only the light receiving element 5A through the light incident port 23Aa and does not reach the light receiving element 5B. Thus, when a light reception signal is outputted only from the light receiving element 5A, it is determined that the rolling member 6 is in the partial light shielding position 61B, i.e., the tilt sensor A1 takes the posture shown in FIG. 8.

Figure 9:
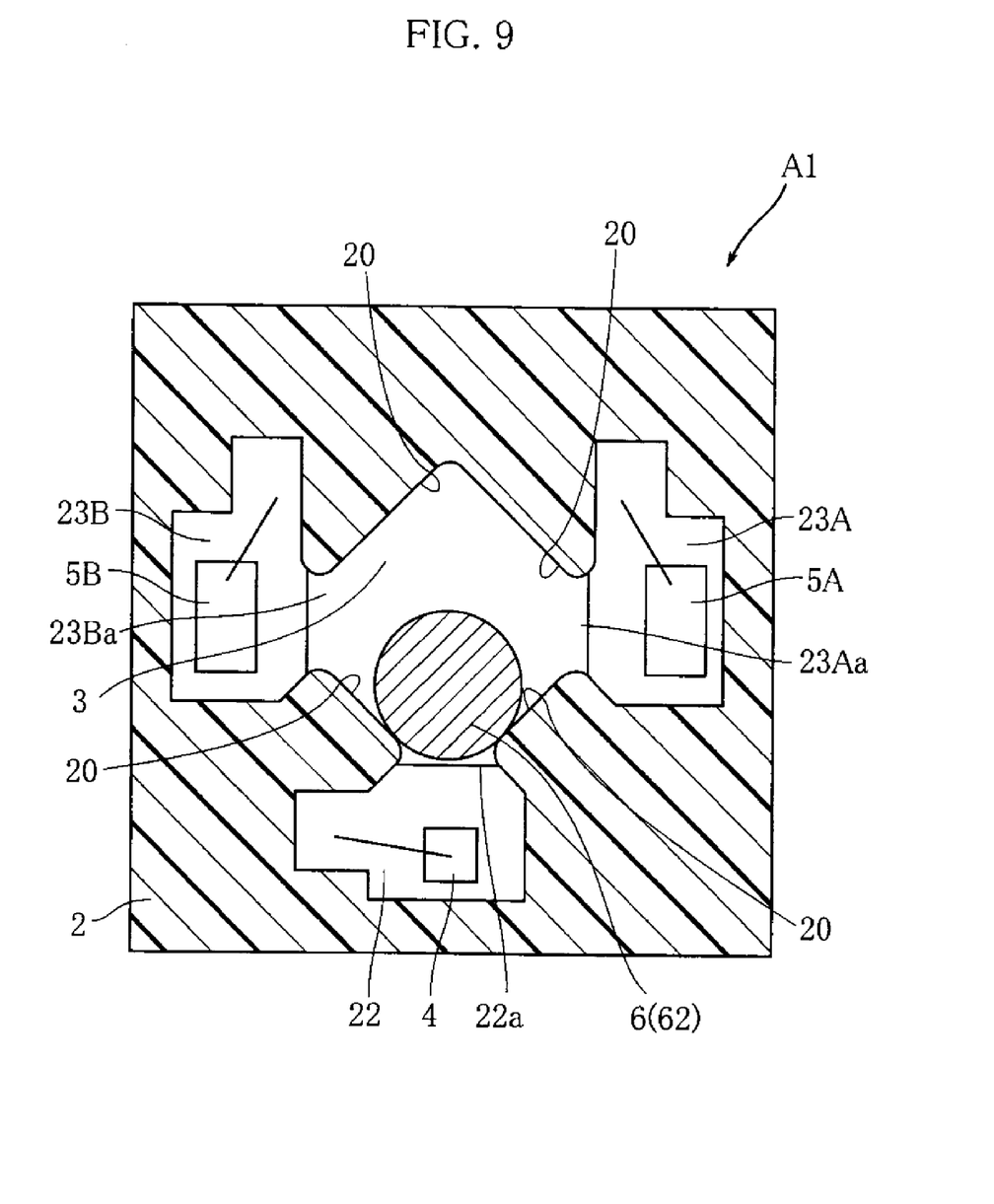
FIG. 9 is a sectional view illustrating the tilt sensor in the 1state in which the rolling member is at a complete light shielding position.

When the tilt sensor A1 is turned through 180 degrees from the state shown in FIG. 2, the tilt sensor A1 takes the posture shown in FIG. 9. In this state, the rolling member 6 is at a position facing the light emitting port 22*a*. Hereinafter, this position is referred to as the complete light shielding position 62. In this state, the light emitting port 22*a* is closed by the rolling member 6. Thus, the light emitted from the light emitting element 4 is blocked completely by the rolling member 6 so that the light does not reach the light receiving element 5A nor the light receiving element 5B. Thus, when no light reception signal is outputted from the light receiving element 5A nor from the light receiving element 5B, it is determined that the rolling member 6 is at the complete light shielding position 62, i.e., the tilt sensor A1 takes the posture shown in FIG. 9.

The tilt sensor A1 described above has the following advantages.

In the tilt sensor A1, the light emitting element 4, the paired light receiving elements 5A and 5B, and the rolling member 6 are arranged to be spaced from each other in directions that are contained in a common plane parallel to the tilt detection target plane. Accordingly, the overall thickness of the tilt sensor A1 is made substantially equal to the total of the thicknesses of the mount board 1, the thickness of the cover plate 9 and the height of the tallest one of the light emitting element 4, the paired light receiving elements 5A, 5B and the rolling member 6. As a result, the thickness of the tilt sensor A1 can be made smaller than that of the conventional tilt sensor (FIGS. 12 and 13). Further, since the main space 3 is substantially rectangular (that is, the space 3 has four geometrically distinguishable corners), it can be determined accurately whether the rolling member 60 is at the light unshielding position 60, the partial light shielding position 61A, 61B or the complete light shielding position 62.

In making the tilt sensor A1, the cover plate 9 is simply bonded to the case 2, that is, it is not necessary to integrally mold the case 2 and the cover plate 9. Thus, the tilt sensor A1 can be made by a simple process.

The reflective film 12 is formed on the cover plate 9, thereby preventing the light emitted from the light emitting element 4 from being absorbed by the cover plate 9. Accordingly, the light receiving elements 5A and 5B can receive a large amount of light, which results in high output from the light receiving elements 5A and 5B.

When the tilt sensor A1 is used, the rolling member 6 may roll a number of times in the space 3 in response to the tilting. When the rolling member 6 rolls, static electricity may be generated between the rolling member 6 and the reflective film 12 or the case 2 due to friction. However, since the case 2 is held in contact with the plating layer 11 which is electrically connected to the ground line, the static electricity does not build up. Further, the rolling member 6 can discharge each time it comes into contact with the case 2. Thus, excessive static electricity does not build up at the rolling member 6. Accordingly, the rolling member 6 does not become immovable in the space 3 due to static electricity.

In bonding the cover plate 9 to the case 2 by using the adhesive 8, the adhesive 8 is pushed by the surface of the reflective film 12 and the facing surface 21 of the case 2 to enter the slits 12*a*. Thus, the adhesive 8 is prevented from entering the space 3. Thus, the rolling member 6 is prevented from becoming immovable by coming into contact with the adhesive 8. Since each of the slits 12a is sufficiently long to overlap the accommodation space 22, 23A or 23B as viewed in plan, a large amount of adhesive 8 is guided into the slit, so that the adhesive is reliably prevented from entering the space 3.

In bonding the cover plate 9 to the case 2, the position of the cover plate 9 relative to the case 2 may slightly deviate from the correct position. Even in such a case, the slits 12a reliably overlap the accommodation space 22, 23A or 23B as viewed in plan.

When the rolling member 6 is at the partial light shielding position 61A or 61B, the light shield 7 provided at the accommodation space 23A or 23B prevents the light from entering the accommodation space 23A or 23B through the gap defined between the cover plate 9 and the rolling member 6. Thus, light shielding is performed reliably.

Similarly, when the rolling member 6 is at the complete light shielding position 62, the light shield 7 provided at the accommodation space 22 prevents the light emitted from the light emitting element 4 from entering the space 3 through the gap defined between the cover plate 9 and the rolling member 6. Thus, proper light shielding is performed reliably.

Figure 10:
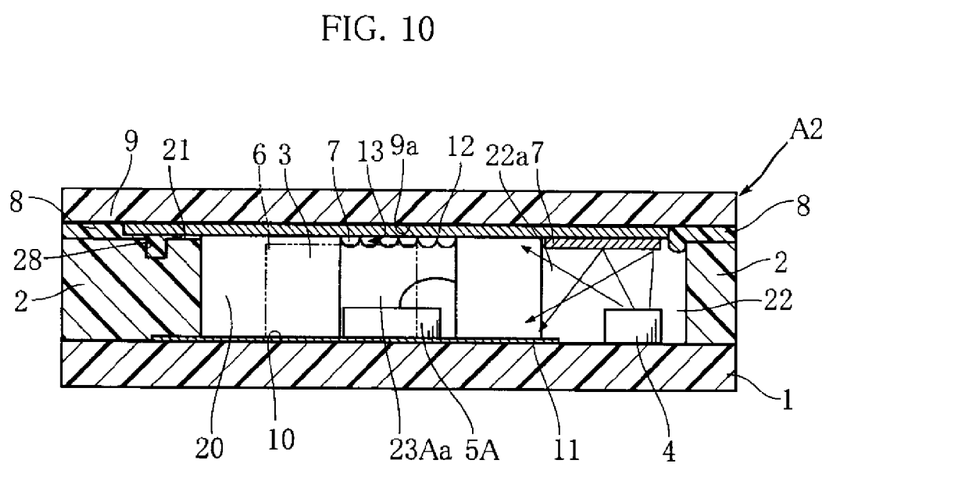
FIG. 10 is a sectional view illustrating a tilt sensor according to a second embodiment of the present invention.
Figure 11:
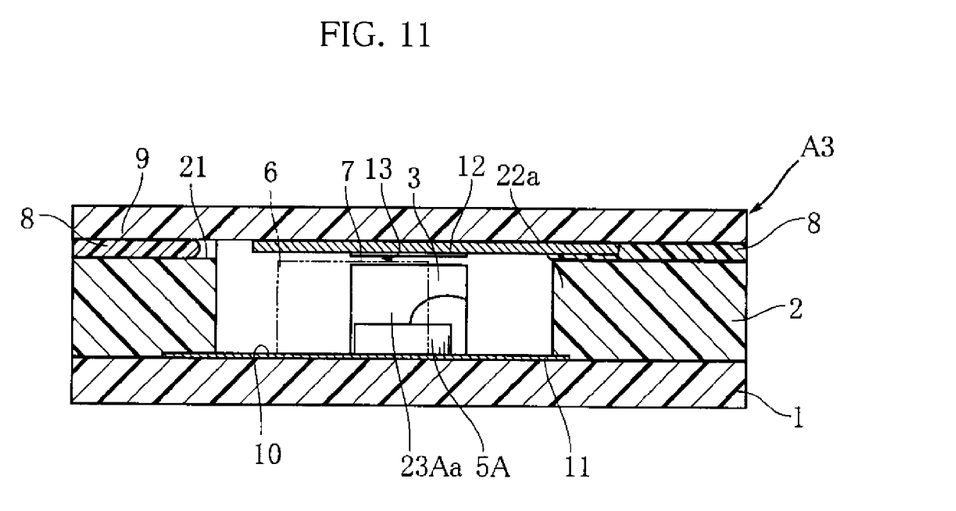
FIG. 11 is a sectional view illustrating a tilt sensor according to a third embodiment of the present invention.

FIGS. 10 and 11 illustrate tilt sensors according to other embodiments of the present invention. In these figures, the elements which are identical or similar to those of the tilt sensor according to the first embodiment are designated by the same reference signs as those used for the first embodiment.

FIG. 10 is a sectional view corresponding to FIG. 4 and illustrates a tilt sensor A2 according to a second embodiment of the present invention. The tilt sensor A2 differs from the tilt sensor A1 of the first embodiment in the following points. The reflective film 12 of the tilt sensor A2 is not formed with slits 12a. Instead, the case 2 of the tilt sensor A2 is formed with a groove 28. The groove 28 has the same function as that of the slits 12a of the tilt sensor A1 according to the first embodiment.

The light shield 7 of the tilt sensor A2 has a semicircular surface extending in the in-plane direction. In this embodiment again, as viewed in the in-plane direction, the light shield 7 overlaps the gap 13, which is defined between the cover plate 9 and the rolling member 6 when the rolling member 6 is in contact with the mount board 1. The arrangement of this embodiment provides the same advantages as those of the first embodiment.

FIG. 11 is a sectional view corresponding to FIG. 5 and illustrates a tilt sensor A3 according to a third embodiment of the present invention. The tilt sensor A3 differs from the tilt sensor A1 of the first embodiment in that the light shield 7 is not connected to the cover plate 9. As shown in FIG. 11, the light shield 7 is connected to the case 2 and is not formed on the reflective film 12. The light shield 7 of this embodiment may be formed integrally on the case 2 in molding the case 2. As viewed in the in-plane direction, the light shield 7 of this embodiment also overlaps the gap 13, which is defined between the cover plate 9 and the rolling member 6 when the rolling member 6 is in contact with the mount board 1. The arrangement of this embodiment provides the same advantages as those of the first embodiment.

The present invention is not limited to the foregoing embodiments. The specific structure of each part of the tilt sensor according to the present invention may be varied in design in many ways. For instance the reflective film 12 may be held in contact with the case 2. With this arrangement, electrostatic charge does not build up in the reflective film 12.

The invention claimed is:

1. A tilt sensor comprising:
a mount board;
a cover plate spaced from the mount board;
a light emitting element and a pair of light receiving elements arranged on an obverse surface of the mount board;
a case arranged between the mount board and the cover plate for accommodating the light emitting element and the light receiving elements, the case being formed with an inner rolling space surrounded by the light emitting element and the light receiving elements, the light emitting element and the light receiving elements being located entirely outside the inner rolling space when viewed in a direction perpendicular to the obverse surface of the mount board; and
a rolling member movably accommodated in the inner rolling space to take any one of a complete light shielding position, a partial light shielding position and a light unshielding position, the complete light shielding position being a position at which the rolling member blocks light emitted from the light emitting element so that the light does not reach neither of the paired light receiving elements, the partial light shielding position being a position at which the rolling member blocks the light emitted from the light emitting element so that the light reaches only one of the paired light receiving elements, the light unshielding position being a position at which the rolling member fails to block the light emitted from the light emitting element so that the light reaches both of the paired light receiving elements;
wherein the rolling member overlaps the light emitting element and the light receiving elements when viewed in a direction parallel to the obverse surface of the mount board.

2. The tilt sensor according to claim 1, further comprising a reflective film formed on the cover plate and exposed to the inner rolling space.

3. The tilt sensor according to claim 2, further comprising a ground terminal formed on the mount board, wherein the reflective film and the case are made of an electrically conductive material, and the ground terminal is electrically connected to the reflective film via the case.

4. The tilt sensor according to claim 2, wherein the case includes a facing surface that faces the cover plate, and the reflective film is formed with a slit that overlaps the facing surface.

5. The tilt sensor according to claim 4, further comprising an accommodation space to accommodate one of the light receiving elements and the light emitting element, wherein the slit extends beyond the facing surface to the accommodation space.

6. The tilt sensor according to claim 2, wherein the case includes a facing surface that faces the cover plate, the facing surface being formed with a groove.

7. The tilt sensor according to claim 2, further comprising: an accommodation space connected to the inner rolling space and accommodating one of the paired light receiving elements; and a light shielding member provided along a boundary between the inner rolling space and the accommodation space and spaced from the obverse surface of the mount board, the light shielding member having a thickness which is no less than a gap between the rolling member and the reflective film.

8. The tilt sensor according to claim 2, further comprising: an accommodation space connected to the inner rolling space and accommodating the light emitting element; and a light shielding member provided along a boundary between the inner rolling space and the accommodation space and spaced from the obverse surface of the mount board, the light shielding member having a thickness which is no less than a gap between the rolling member and the reflective film.

9. The tilt sensor according to claim 1, wherein each of the mount board, the cover plate and the case is rectangular.

10. The tilt sensor according to claim 9, wherein the light emitting element and the light receiving elements are arranged adjacent to three sides of the rectangular case rectangle, respectively.

* * * * *